United States Patent
Siegel

(10) Patent No.: US 6,959,715 B2
(45) Date of Patent: Nov. 1, 2005

(54) UMBRELLA FOR DEPARTING AUTO PASSENGER

(76) Inventor: Frederic S. Siegel, 133 Lagoon Dr. East, Lido Beach, NY (US) 11561

(*) Notice: Subject to any disclaimer, the term of this patent is extended or adjusted under 35 U.S.C. 154(b) by 246 days.

(21) Appl. No.: 10/414,060

(22) Filed: Apr. 16, 2003

(65) Prior Publication Data
US 2004/0206381 A1 Oct. 21, 2004

(51) Int. Cl.[7] ............................................. A45B 3/00
(52) U.S. Cl. ....................................................... 135/16
(58) Field of Search ........................ 135/16, 20.1, 20.3, 135/21, 88.09

(56) References Cited

U.S. PATENT DOCUMENTS

| 351,669 A | * | 10/1886 | Tosso ............................ 248/515 |
| 4,658,996 A | * | 4/1987 | Warmath ........................ 223/96 |
| 4,878,276 A | * | 11/1989 | Morrish et al. ................ 24/511 |
| D316,333 S | * | 4/1991 | Maki ............................. D6/328 |
| 5,033,528 A | * | 7/1991 | Volcani ......................... 160/351 |
| D322,390 S | * | 12/1991 | Nimtz et al. .................. D8/395 |
| D327,166 S | * | 6/1992 | Barker .......................... D3/13 |
| 5,150,728 A | * | 9/1992 | Stark ............................ 135/16 |
| D338,327 S | * | 8/1993 | Lewis ............................ D3/5 |
| 5,241,728 A | * | 9/1993 | Hunter ......................... 24/511 |
| 5,287,871 A | * | 2/1994 | Trice ........................... 135/88.05 |
| 5,385,161 A | * | 1/1995 | Loker et al. .................. 135/15.1 |
| 5,896,880 A | * | 4/1999 | Bushweller et al. ............ 135/16 |
| 5,937,881 A | * | 8/1999 | Villa ........................... 135/20.1 |
| 6,401,736 B1 | * | 6/2002 | Jerry ........................... 135/25.1 |
| 6,405,742 B1 | * | 6/2002 | Driscoll ....................... 135/96 |
| D477,906 S | * | 8/2003 | Martin .......................... D3/5 |
| 2003/0037811 A1 | * | 2/2003 | Altobelli ....................... 135/16 |

FOREIGN PATENT DOCUMENTS

| DE | 29703661 U1 | * | 4/1997 | .......... A45B/23/00 |
| JP | 09156426 A | * | 6/1997 | ............. B60R/7/12 |
| JP | 2001122037 A | * | 5/2001 | ............. B60R/7/12 |
| WO | WO 2003045735 A2 | * | 6/2003 | ........... B60R/00/00 |

* cited by examiner

Primary Examiner—Korie Chan
(74) Attorney, Agent, or Firm—Myron Amer, PC

(57) ABSTRACT

A procedure for an umbrella-assisted departure on a rainy day through a door opening used to exit from a vehicle, in which an open umbrella is clamped to the top edge of the door so that the site of attachment correlates to the bottom hand-held location on the umbrella rod at which it is gripped during normal use, so that the head room under the umbrella during use is necessarily also the head room during departure, thereby obviating a crouching inconvenience in the departure procedure.

1 Claim, 2 Drawing Sheets

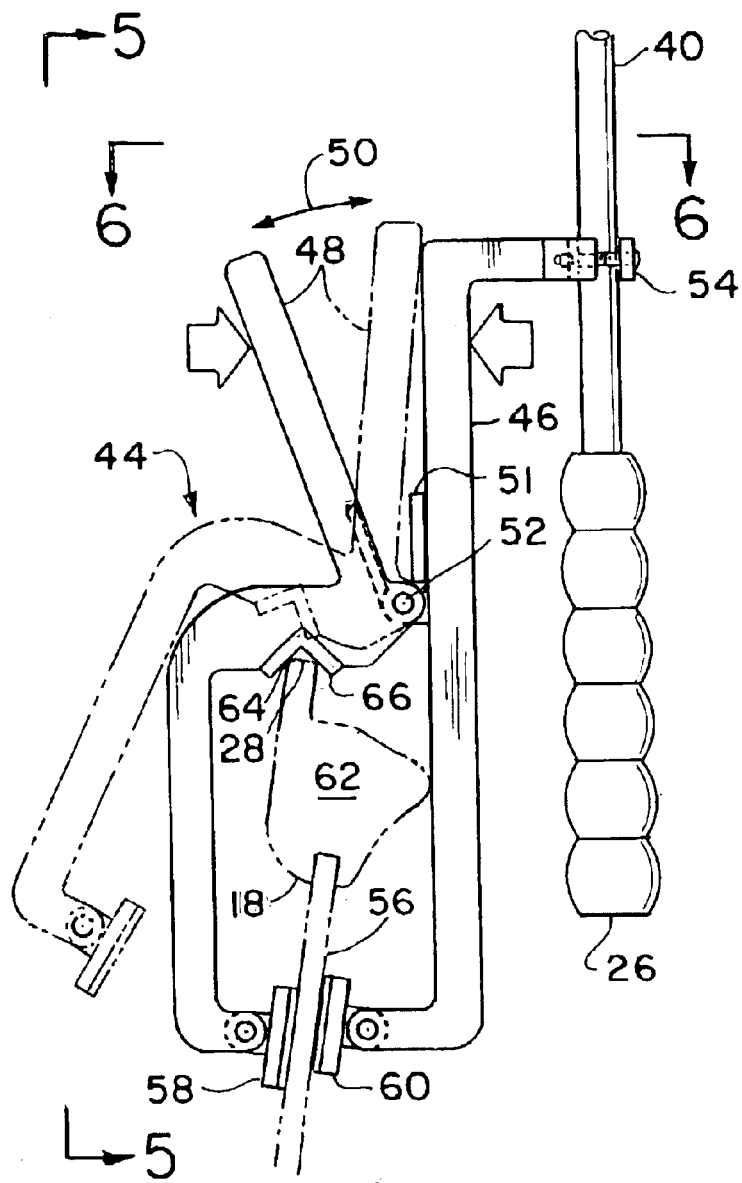
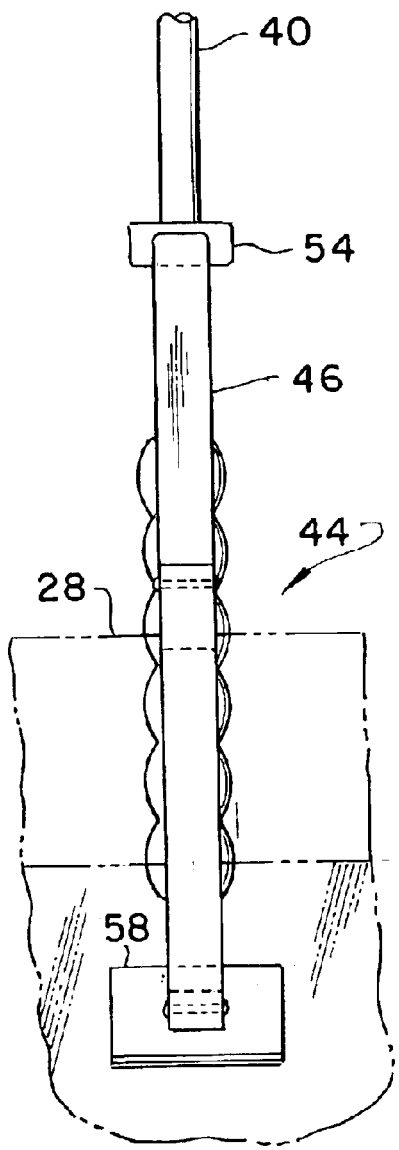
FIG.4  FIG.5
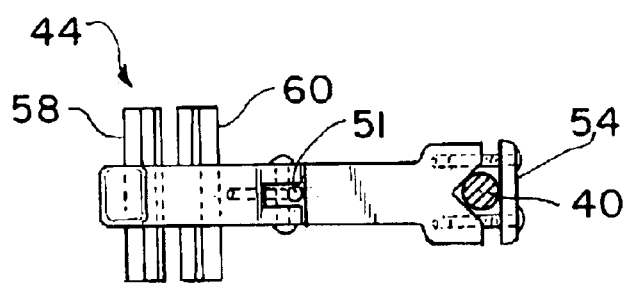
FIG.6

UMBRELLA FOR DEPARTING AUTO PASSENGER

The present invention relates generally to umbrella improvements, the improvements more particularly facilitating on a rainy day an umbrella-assisted departure from a vehicle.

EXAMPLES OF THE PRIOR ART

Prior art efforts to keep an individual, on a rainy day, dry while departing from a vehicle are exemplified by U.S. Pat. No. 5,476,302 for "RAIN COVER FOR CAR DOOR" issued to Ronci on Dec. 19, 1995, U.S. Pat. No. 6,044,856 for "RAIN SHIELD CANOPY FOR USE WITH AN AUTOMOBILE" issued to Cano on Apr. 4, 2000, and U.S. Pat. No. 5,150,728 for "UMBRELLA WITH MAGNETIC FASTENERS:" issued to Stark on Sep. 29, 1992, to mention but a few. In the foregoing, and all other known similar patents, the umbrella is opened prior to departure and used as cover, but the open umbrella headroom is inadequate and the departing individual has to crouch while departing and otherwise is unnecessarily inconvenienced.

Broadly, it is an object of the present invention to overcome the foregoing and other shortcomings of the prior art.

More particularly, it is an object to correlate with each other in a departure sequence the height dimension of the vehicle door and the size of the umbrella rod which determines the headroom of an open umbrella, that crouching and other inconvenience, such as difficulties experienced in package removal during departure, are effectively obviated, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIGS. 1–3, inclusive, are side elevational views illustrating in sequence an umbrella-assisted departure on a rainy day from a vehicle according to the present invention;

FIG. 4 is an isolated side elevational view, on an enlarged scale, taken in the direction 4—4 of the arrows in FIG. 1;

FIG. 5 is a front view taken in the direction 5—5 of the arrows in FIG. 4; and

FIG. 6 is a plan view taken in the direction 6—6 also of the arrows in FIG. 4.

As known from common experience, departure from a vehicle 10 on a rainy day is inconvenient and clumsy, despite even having an umbrella 12, because the handling of the umbrella and also packages 14 are chores not easily managed. The present invention solves this problem in the umbrella-assisted departure illustrated in sequence in FIGS. 1–3, inclusive.

Figure 1:
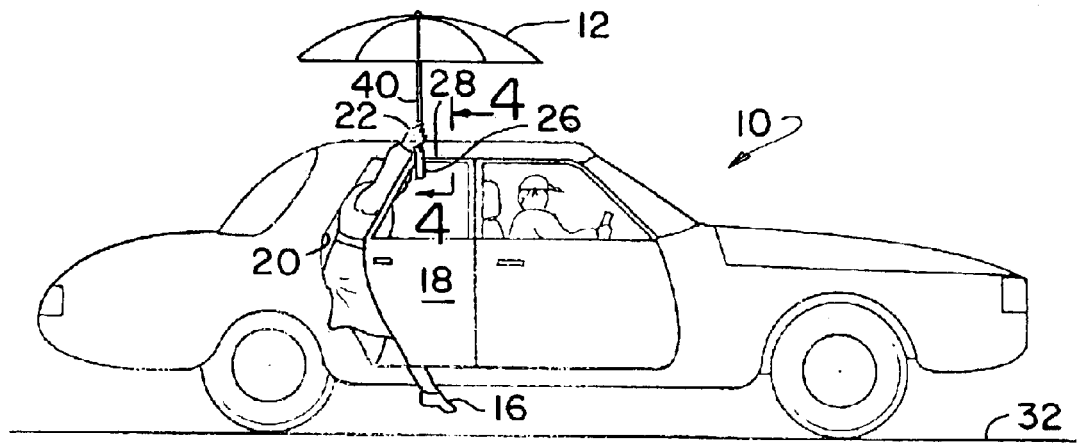

More particularly, the departing individual 16 from the inside opens the door 18 and urges it into a slight clearance position as illustrated in FIG. 1, and in the clearance 20 projects the closed umbrella outside the vehicle 10 and using both hands 22, 24 which are then free for the task, actuates the closed umbrella into its open condition 12A.

Figure 2:
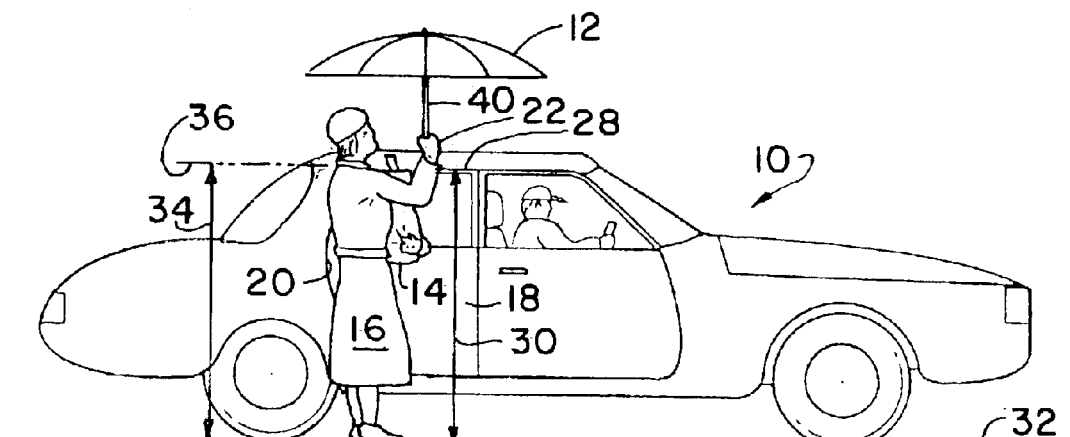

Next, the umbrella handle 26 is attached to the top edge, as at 28, of the door, as soon will be described, which frees both hands 22, 24 to remove packages 14 and to facilitate departure of the individual 16 with the packages 14, as illustrated in FIG. 2.

The umbrella handle 26 is detached, the door 18 closed by body contact therewith, and the individual 16 with packages 14 under the cover of the umbrella 12 departs from the vehicle 10.

Underlying the present invention is the recognition that the height 30 from the street level 32 to the attachment site 28 of the top of the door 18 is approximately the same distance 34 above street level that an individual locates the handle 26 of an umbrella 12 during use, namely at a location that is approximately shoulder high, as noted at 36. This is taken into account in the manufacture of umbrellas and dictates the size 38 of the umbrella rod 40 so that when open, there is sufficient headroom 42 as depicted in FIG. 3, for the individual 16.

The preferred manner of establishing attachment at the site 28 illustrated in FIGS. 4, 5 and 6. A clamp, generally designated 44, has a stationary clamp member 46 and a movable clamp member 48 and an operating mode in which the movable clamp 48 partakes of opening and closing movements 50 under the urgency of a spring 51 about a pivot 52, the clamp member 46 being secured, as at 54, to the bottom of the umbrella rod 40, and the door window 56 engaged between grippers 58 and 60 on the clamps 48, 46 and the full weight of the clamps 48, 46 is diminished by the weather seal molding 62 about the door 18 seated, as at 64 within an edge-engaging fixture 66.

Figure 3:
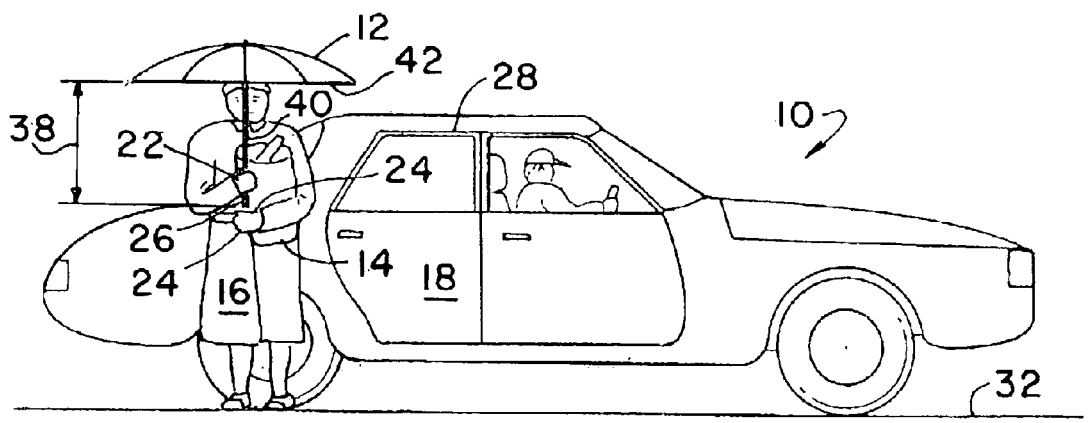

The clamp 44 can be integral to the umbrella 12 or sold separately as a retrofitted attachment to an umbrella to be used in accordance with the departure sequence of FIGS. 1–3.

While the departure sequence and the spring clip therefor herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For an umbrella in the use of which said umbrella in an open condition is used during departure of an individual with packages through an open door of an automobile on a rainy day, the improvement comprising attaching a bottom end of a handle of said open umbrella to a top edge of said open door bounding a window of said door to provide an operative attached position of said umbrella to said top edge bounding said door window providing standing room for said departing individual beneath said umbrella, operative positions of both hands of said departing individual engaged about said packages during departure through said open door, and one hand of said individual removed from said engaged operative position about said packages and assuming an operative position in contact with and disengaging said handle bottom end from said top edge of said door, whereby said disengaged umbrella has use value in maintaining said individual and packages dry during said departure from said automobile.

* * * * *